Nov. 28, 1939. W. T. HINCKLEY 2,181,731
MULTIPLE EFFECT EVAPORATOR AND THE LIKE
Filed June 28, 1937 11 Sheets-Sheet 1

Fig. 1.

Inventor:
William T. Hinckley
by Thos. A. Ramsay
Atty.

Nov. 28, 1939.  W. T. HINCKLEY  2,181,731
MULTIPLE EFFECT EVAPORATOR AND THE LIKE
Filed June 28, 1937  11 Sheets-Sheet 4

Inventor:
William T. Hinckley
by [signature]
Atty.

Nov. 28, 1939.  W. T. HINCKLEY  2,181,731
MULTIPLE EFFECT EVAPORATOR AND THE LIKE
Filed June 28, 1937  11 Sheets-Sheet 6

Inventor:
William T. Hinckley
by Thos. A. ...
Atty.

Nov. 28, 1939.　　　W. T. HINCKLEY　　　2,181,731
MULTIPLE EFFECT EVAPORATOR AND THE LIKE
Filed June 28, 1937　　　11 Sheets-Sheet 10

Fig.13.

Inventor:
William T. Hinckley
by Thos. A. Quinn
Atty.

Fig.14.

Patented Nov. 28, 1939

2,181,731

UNITED STATES PATENT OFFICE 2,181,731

MULTIPLE EFFECT EVAPORATOR AND THE LIKE

William T. Hinckley, Chicago, Ill., assignor to Whiting Corporation, Harvey, Ill., a corporation of Illinois Application June 28, 1937, Serial No. 150,746

4 Claims. (Cl. 159—17)

My invention relates to concentrating evaporators. More specifically, it deals with the liquor and vapor connections in multiple effect evaporators and the methods of operations made possible by such connections.

One purpose of my invention is to make it possible to use a smaller (and hence cheaper) evaporator for reaching a given concentration. Another purpose of my invention is to make it possible to reach higher concentrations when evaporating viscous liquor than is ordinarily economically possible. Another purpose of my invention is to diminish difficulties due to foaming on such liquors as tend to foam when first fed to the evaporator. Other purposes and advantages will appear hereinafter.

I shall describe my invention particularly in terms of that type of evaporator commonly known as the long-tube vertical evaporator, but I wish it understood that my invention is applicable to any type of evaporator construction except as I may limit its application in the claims. I shall also discuss the application of my invention specifically to the concentration of the waste liquors produced in the sulfate or kraft process of manufacturing pulp, which liquors are commonly known as sulfate black liquor. It is to be understood, however, that I am not limiting my invention to such liquors but that it is applicable to the concentration of any liquor which reaches high viscosity in the finish stage. Such liquors usually contain large amounts of organic colloidal material; and I may mention as other liquors of similar class sulfite black liquor, glue, edible gelatin, blood, and other similar solutions.

It is a well known fact that when a solution is concentrated from low concentrations to high ones equal increments of water removal do not produce equal increments of concentration. This means that in a multiple effect evaporator which is fed by either forward or backward feed, a very large change of concentration occurs in that effect in which the liquor is finished. It is also well known that in solutions of the type discussed here, the viscosity rises slowly with increasing concentration in the dilute liquor and very rapidly in concentrated liquors. Further, for any solution viscosity decreases rapidly with temperature rise. It is also a well established fact that increase in viscosity rapidly decreases the coefficient of heat transfer in an evaporator.

My invention consists essentially in subdividing the thick liquor effect into two or more bodies or sub-effects operated in parallel as to heating steam and vapor, but in series as to feed.

I wish particularly to distinguish between such a division and the simple addition of another effect to a multiple effect evaporator. The number of effects to be used in a given case is determined by an economic balance between savings due to an increased number of effects and increased costs due to a larger evaporator. The question of using a larger or smaller number of effects is solely a question of steam economy. My invention is not concerned with steam economy in any way, but is concerned solely with capacity and with practical details of operation.

Consider, for instance, a quadruple effect evaporator concentrating sulfate black liquor and fed backward. In this arrangement the most concentrated liquor is in the first effect. When concentrating thru the range of let us say 17% solids for thin liquor, and 57% solids for thick liquor, the concentrations in the various effects will be approximately as follows:

|   | Per cent |
|---|---|
| 1 | 57.0 |
| 2 | 35.8 |
| 3 | 26.5 |
| 4 | 20.6 |

It will be noticed that there is a very large difference in concentration (and therefore a large difference in viscosity) between the first effect and the following one. This results in a corresponding decrease in the heat transfer coefficients. For instance, in one case that has come to my notice in concentrating sulfate black liquor, the second effect operated with a heat transfer coefficient of 550 B. t. u. per square foot per degree Fahrenheit per hour, whereas the first effect operated with a coefficient of 100 B. t. u. per square foot per degree Fahrenheit per hour. This low coefficient in the first effect obviously held over the entire first effect and correspondingly decreased the capacity of the entire evaporator.

Suppose that this first effect were divided into two sub-effects through which the liquor flowed in series, but which were in other respects operated in parallel. In one case in the embodying of my invention the distribution of surface between the two sub-effects was such that the first sub-effect carried the liquor to about 51.5% total solids and the second sub-effect carried it from this concentration to 57% total solids. The second effect fed liquor to the first sub-effect at approximately 37% total solids; consequently per 100 lbs. dry solids passing thru the evaporator there were evaporated in the first sub-effect 75 lbs. of solvent and in the second sub-effect 20 lbs. Thus the second sub-effect is doing only a fraction of the evaporation and therefore may be smaller than the first sub-effect. Under these conditions this particular installation had a heat transfer coefficient in the first sub-effect of 185 B. t. u. per square foot per degree Fahrenheit per hour; while the second sub-effect which was carrying the concentration to 57% as before, had a coefficient of approximately 100 B. t. u. per square foot per degree Fahrenheit per hour. Thus it is seen that the average coefficient for the two bodies of the first effect is now much higher than when a single first effect is used and consequently a much smaller heating surface is necessary to accomplish the same evaporation.

It is obvious that in the practice of my invention I may take advantage of the increased average coefficient of the first effect in three ways: (a) I may finish the liquor at the same concentration that could be reached in an ordinary multiple effect evaporator with an undivided thick liquor effect and by virtue of the higher average heat transfer coefficient in the last effect use less heating surface, and therefore have a cheaper evaporator; (b) I may build the evaporator as large as before, and take advantage of the increased average heat transfer coefficient in the thick liquor effect by carrying the liquor to higher concentrations. This is particularly feasible because the decrease in heat transfer coefficient due to the increased concentration now falls only on the very small final sub-effect and is practically unnoticed in the other effects; or (c) I can strike any desired mean between (a) and (b) and thus both have a somewhat smaller evaporator and at the same time going to somewhat higher concentrations.

Many liquors of the type of sulfate black liquor tend to foam in that effect into which the thin liquor is fed. It is found in practice that after a certain concentration is reached this foaming stops. If the thin liquor can be fed into a body of already partly concentrated liquor, difficulties due to foaming are greatly decreased.

Returning to the typical quadruple effect evaporator concentrating sulfate black liquor from 17% to 57%, I found in practice, in one case, that the liquor leaving the thin liquor effect and going to the third effect was at approximately 18.5% solids while the third effect carried the concentration to approximately 21% solids. We find in practice that if thin liquor is fed into a body of liquor at 18.5% solids it still foams. If it is fed into a body of liquor at 21% or higher it does not foam seriously.

This feature of my invention consists in dividing the thin liquor feed so that instead of all going to the fourth effect, part is fed to the fourth effect and part to the third effect. In such a case, instead of the customary flow of liquor from the fourth effect to the third effect, and from the third effect to the second, I combine the two quantities of liquor withdrawn from the fourth effect and from the third effect and send this combined stream directly to the second effect. The result of this is that both the third and fourth effect contain liquor of the same concentration that would have existed only in the third effect with the ordinary application of backward feeding, and consequently all the thin liquor is fed into a solution sufficiently concentrated so that foaming difficulties are not now serious. It is true that the fourth effect now operates with liquor not at 18.5% solids but at 21% solids. This change in concentration, however, is not sufficient to appreciably increase the viscosity and consequently the heat transfer coefficient in the fourth effect is not appreciably decreased by this slight increase in concentration.

Altho I have described my invention in terms of an evaporator operated with backward feed (i. e., fed so that the most concentrated liquor is in the first effect) I do not wish to limit my invention in its broader aspects to multiple effect evaporators that are fed backward. In the case of evaporators fed forward (i. e., with the most concentrated liquor in the last effect) similar advantages will be obtained by subdividing the last effect into two or more bodies or sub-effects. The same is true for cases of a mixed feed. I wish to emphasize the fact that my invention concerns the sub-dividing of the thick liquor effect into two or more sub-effects irrespective of the method of feeding used and consequently irrespective of whether the thick liquor effect is the first, or some other effect.

With respect to that feature of my invention that has to do with the prevention of foaming, I wish to emphasize the fact that this also is not confined to evaporators operated with backward feed. The same advantages are obtained by feeding the first two or more liquor effects in parallel, whether these be the last two or more effects of the evaporator as would be the case when backward feed is used; the first two or more effects of an evaporator as would be the case when forward feed was used, or some two or more intermediate effects as would be the case with mixed feed.

A further feature of the inventon relates to the provision of an arrangement whereby any given effect or sub-effect may be temporarily cut out or isolated from the system for purpose of replacement or repair without interrupting the continuous operation of the system; and especially to make provision for this desirable result in the thick liquor effect of the series—since the same operates on high liquor concentration and is therefore particularly subject to the harmful influences accompanying such high liquor concentration.

To this end a further feature of the invention relates to the provision of an arrangement such that in case of necessity for repair or replacement of the tubes in either sub-effect of the thick liquor effect, the system may nevertheless continue to be operated continuously thru the other sub-effect, but at somewhat reduced capacity, in other words with a somewhat reduced rate of liquor flow throughout the system. In other words when making repairs on the tubes or other parts of either sub-effect of the thick liquor effect the system may nevertheless continue to function during such intervals, but at reduced capacity, but making it possible to maintain the continuity of operation during such intervals. This is a very highly desirable result in the operation of plants of this type. It may also be stated that in some cases this feature of the invention may also be applicable to the cutting out of other bodies or effects of the system from time to time when necessary in order to maintain the continuity of plant operation during the repair or replacement of tubes in any given effect of the series.

Other objects and uses of the invention will appear from a detailed description of the same, which consists in the features of construction and combinations of parts hereinafter described and claimed.

The typical detailed installation herein illustrated is one in which use is made of a series of long-tube vertical evaporators of a type which are well known and understood in this art. Each of these evaporators includes a heating unit having bottom and top tube sheets between which there extends a bundle of heating tubes through which the liquor flows upwardly, and during this operation the tubes are subjected to the heating action of steam or other heating medium in contact with their external surfaces. This heating steam is introduced into the upper portion of each evaporator from what may be called a steam chest and flows downwardly around the outside surfaces of the tubes to the lower ends thereof, and the condensation collects adjacent to the lower tube sheet and may be removed through a suitable condensation take-off connection.

Each evaporator also includes a vapor head which receives the upper portion of the heating unit and into which the tubes discharge the upflowing liquor and the vapor evaporated from such liquor during the rise of the liquor up thru the tubes. Within such vapor heads the vaporized material and the unvaporized liquor are primarily separated, the liquor collecting in the lower portion of the vapor head from which it may be removed in any suitable manner. The vapor from the vapor head is delivered either to the steam chest of the next succeeding unit or effect of the series or to some other suitable point of disposition, such as the condenser.

The arrangement illustrated is a five effect arrangement of the backward flow type.

Figures 1, 15:
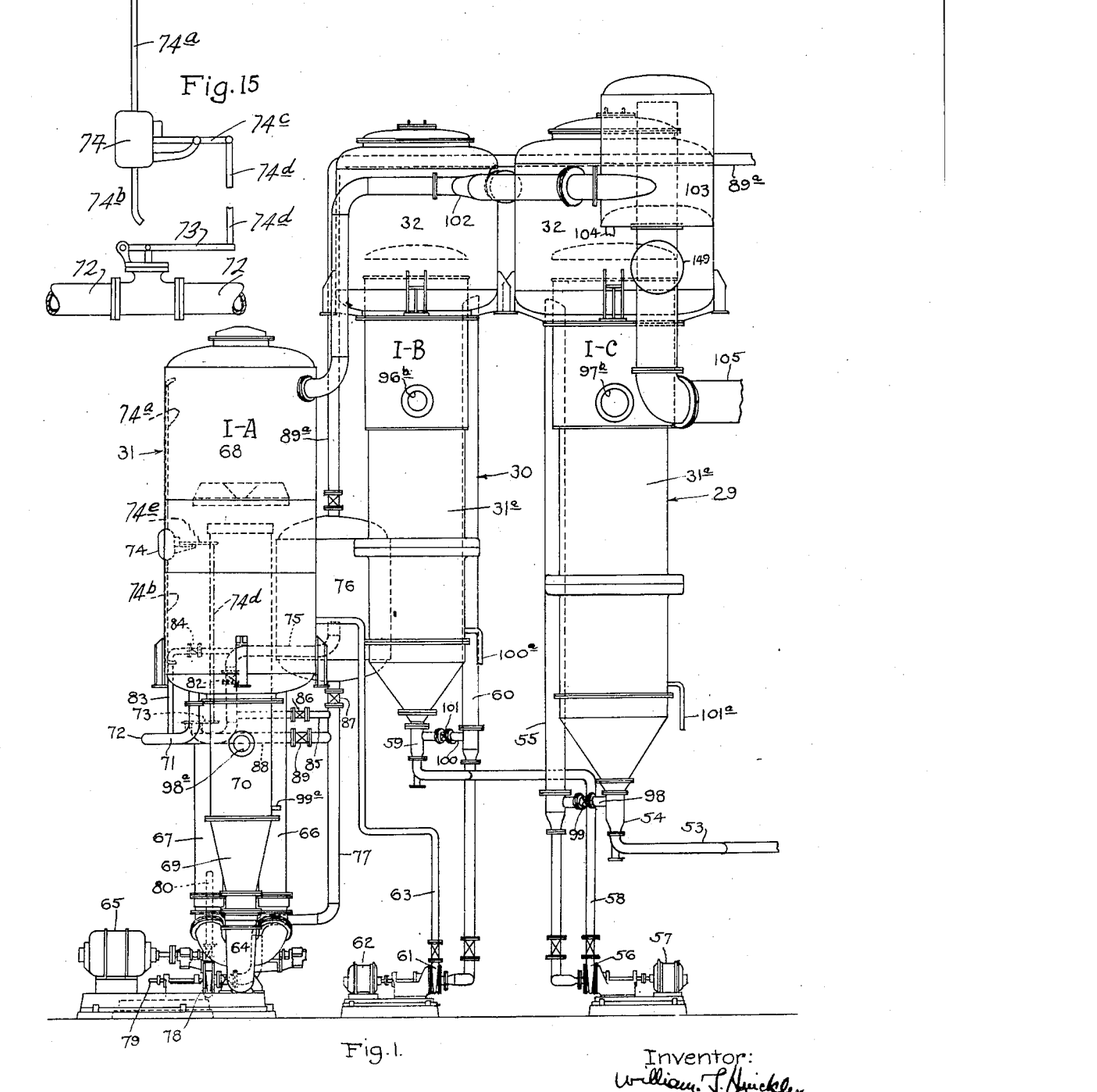
Figure 1 shows a front elevation of a portion of a typical "backward flow" installation embodying the features of the present invention, illustrating the sub-bodies or sub-units of the first effect, which in the arrangement illustrated includes three sub-bodies, two of which are long-tube vertical evaporators, and the third sub-unit of which is a forced feed evaporator.
Figure 15 shows a detail showing of certain parts for control of liquor flow adjacent to the first effect.
Figure 2:
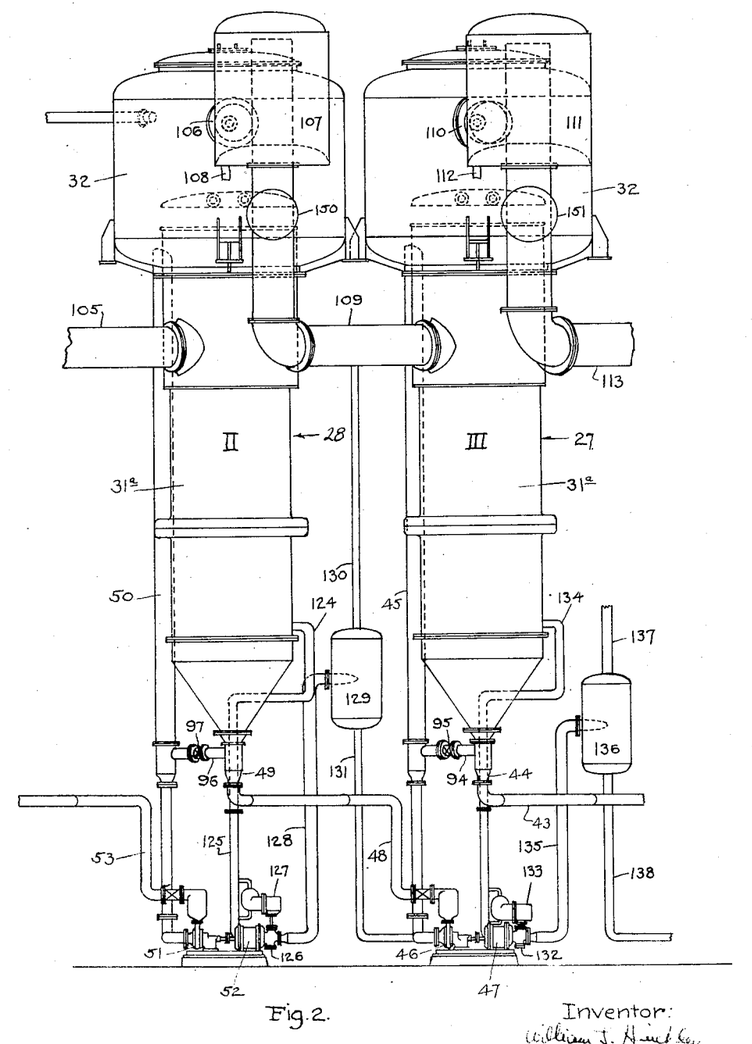
Figure 2 shows a front elevation of the second and third effects of the typical installation aforesaid, embodying the features of the present invention, being a continuation of Figure 1.
Figure 3:
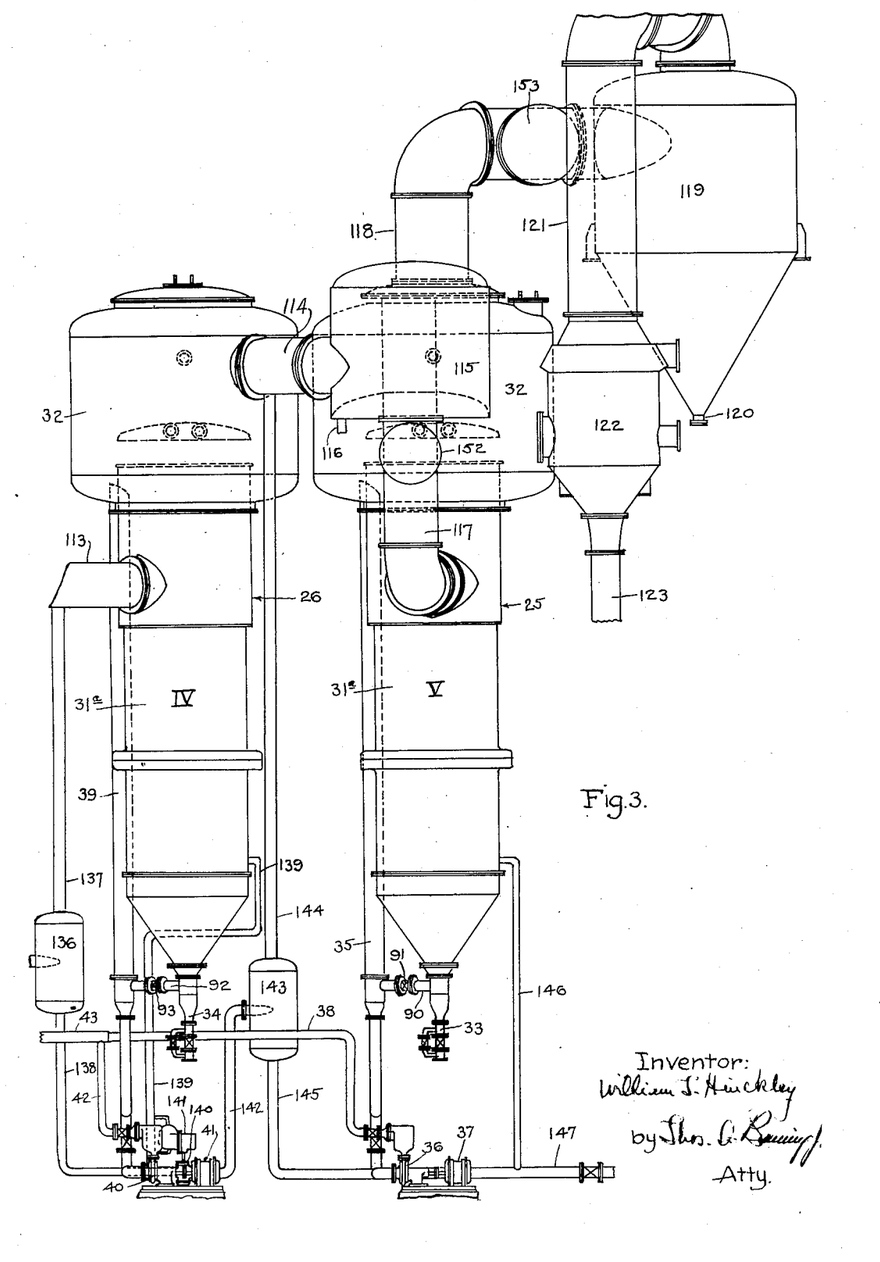
Figure 3 shows a front elevation of the fourth and fifth effects of the typical installation of Figures 1 and 2, being a continuation of Figure 2.
Figure 4:
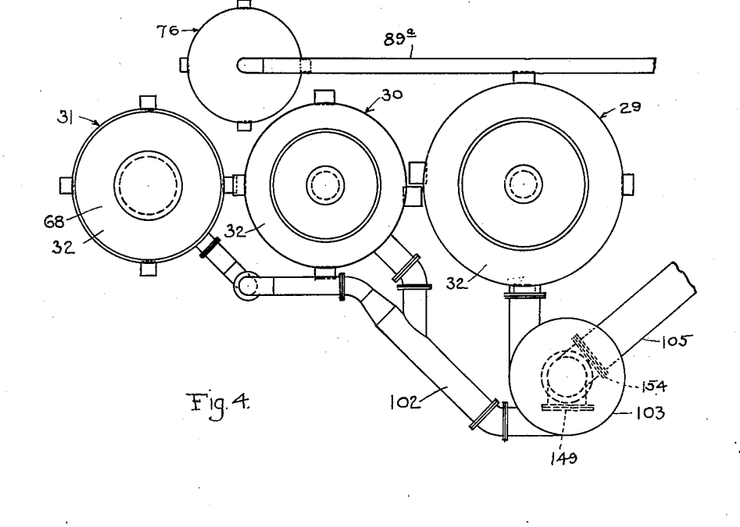
Figure 4 shows a top plan view corresponding to Figure 1.
Figure 5:
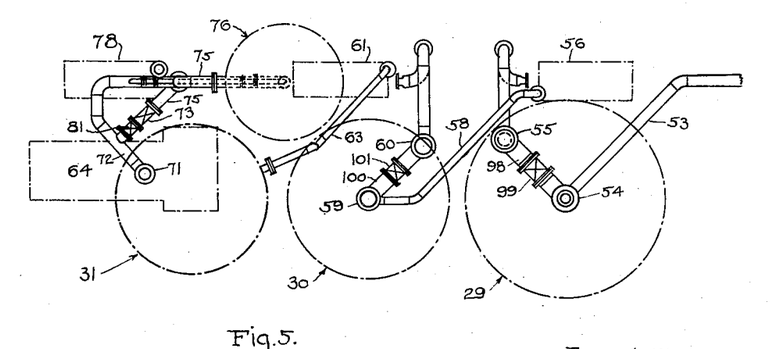
Figure 5 shows a bottom piping diagram corresponding to Figures 1 and 4.
Figure 6:
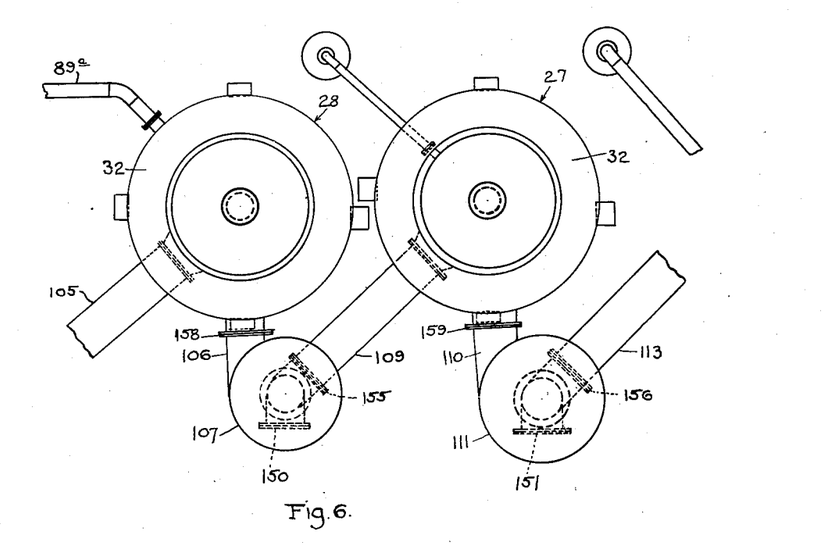
Figure 6 shows a top plan view corresponding to Figure 2.
Figure 7:
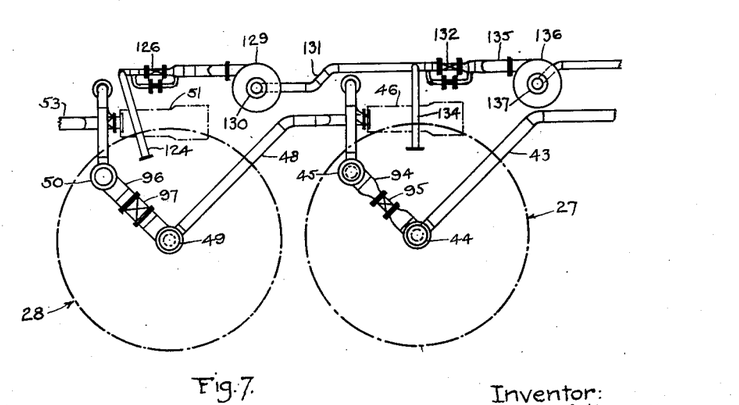
Figure 7 shows a bottom piping diagram corresponding to Figures 2 and 6.
Figure 8:
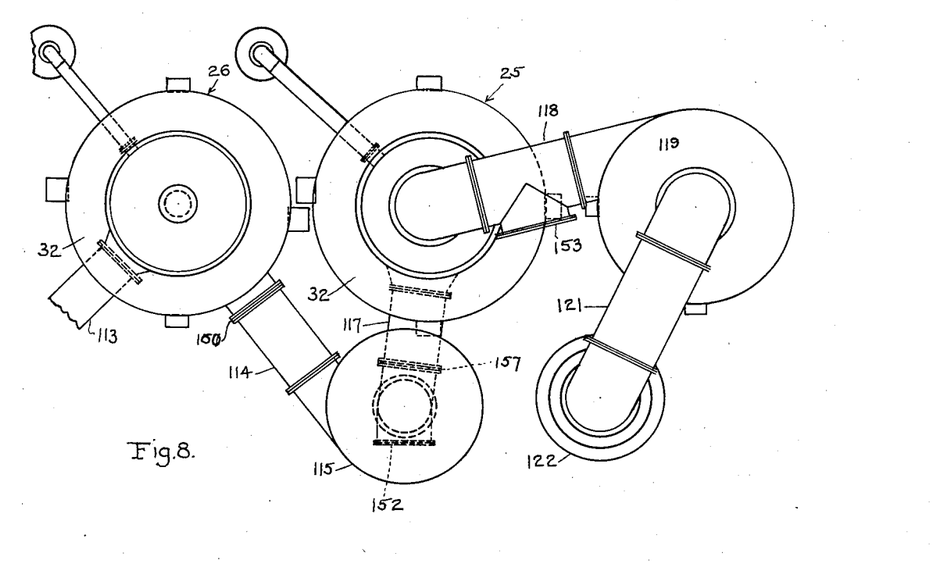
Figure 8 shows a top plan view corresponding to Figure 3.
Figure 9:
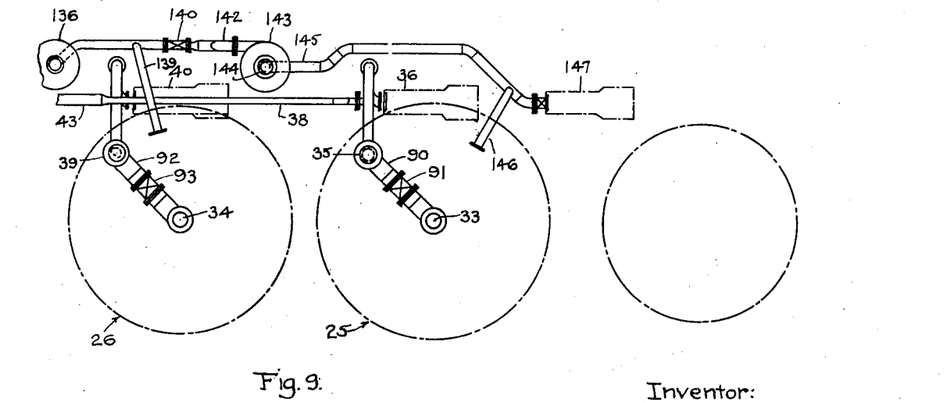
Figure 9 shows a bottom piping diagram corresponding to Figures 3 and 8.

In this particular arrangement the fifth, fourth, third and second effects are designated by the numerals 25, 26, 27 and 28 respectively. The first effect, being in this instance the thick liquor effect, is subdivided into the two sub-effects, 29 and 30 respectively of the long-tube vertical type; besides which the particular arrangement illustrated includes a third sub-effect, being shown at 31, and being in this instance a forced feed evaporator for reasons which will be hereinafter explained more in detail.

As already mentioned each of the effects 25, 26, 27, 28, 29 and 30 includes the heating unit 31a together with the vapor head 32.

In the particular hook-up or system illustrated in these drawings the thin liquor is supplied by pipe 33 into the lower end of the fifth effect 25, and also through the connection 34 into the lower end of the fourth effect 26 in parallel therewith, so that the inflowing thin liquor enters both the fifth and fourth effects simultaneously and flows up through both of them in parallel. The treated liquor from the vapor head 32 of the fifth effect 25 flows down thru the connection 35 to the centrifugal pump 36, driven by the motor 37, and from said pump said liquor flows across thru a manifold connection 38. Likewise the liquor concentrated in the fourth effect 26 flows down through the downpipe 39, to the centrifugal pump 40 driven by the motor 41, and is delivered from said pump thru the connection 42 to the same manifold pipe 38. Thus the liquor from both of the fifth and fourth effects, 25 and 26, is delivered into the common connection 43, through which it is delivered into the intake connection 44 for the third effect 27.

The liquor from the vapor head 32 of the third effect 27 is delivered thru the downcomer 45 to the pump 46 driven by the motor 47, and from said pump 46 said liquor is fed across connection 48 to the liquor inlet 49 of the second effect 28. The liquor from the vapor head 32 of the second effect 28 is delivered through the downcomer 50 to the pump 51 driven by the motor 52, and from said pump 51 said liquor is fed across connection 53 to the liquor inlet 54 of the sub-effect 1—C of the first effect 29. From the vapor head 32 of said sub-effect 1—C the liquor is delivered down through the downcomer 55 to the pump 56 driven by the motor 57, and from said pump 56 the liquor is fed across the connection 58 to the liquor inlet 59 of the sub-effect 1—B, of the first effect, designated 30. From the vapor head 32 of the sub-effect 1—B, the liquor is delivered through the downcomer 60 to the pump 61 driven by the motor 62; and from said pump 61 said liquor is fed by the cross connection 63, either to a suitable point of discharge or to a further concentration in the sub-effect I—A, of the first effect, designated 31.

When the liquor is to be finally concentrated to a high degree so that it is desirable to use a forced feed concentrator as shown in the drawings, use may be made of this sub-effect I—A, designated 31. The same is a forced feed concentrator making use of a motor drive pump for recirculating the liquor through the concentrator; and the incoming liquor is delivered in continuous fashion into the recirculating stream, and the liquor of final concentration is withdrawn from said stream at the proper rate. By this arrangement, which is well understood in the art, a certain portion of the liquor is constantly undergoing reconcentration, and the new liquor is continuously entering said stream and being reconcentrated and the final concentration of liquor is being continuously withdrawn at the same rate.

In the arrangement illustrated this forced feed concentrator 31 includes the centrifugal pump 64 driven by the motor 65. The down connections 66 and 67 take liquor from the lower portion of the vapor head 68 of the concentrator, deliver the same to the pump 64, and from said pump the liquor is returned through the riser 69 to the tubes of the heating unit 70, rising through said tubes and being delivered at their upper ends again into the central portion of the vapor head 68. Thus the function of the pump 64 is merely to recirculate a considerable volume of liquor through the system and thus subject the liquor to a repeated process of heating and concentration. The delivery connection 71 from the lower portion of the vapor head 68 leads thru the connection 72 to a suitable controller valve lever 73 for automatically maintaining the level of the liquor in the vapor head 68 at the desired level under control of a float within the chamber 74. The construction and operation of this automatic regulator is well understood in the art and it is not deemed necessary to describe the same at this point in detail. However, I will state that the float chamber 74 is connected by the upper and lower lines 74a and 74b with the vapor head, so that the liquor stands in said float chamber at the same level as in the vapor head; and a float within the chamber 74 operates a lever 74c connected to the controller lever 73 of the valve in the line 72, by the link 74d so that said valve is opened and closed according to the changing liquid level conditions in the vapor head. It will be sufficient to say that as the level of the liquor within the tank 68 rises the float within the chamber 74 serves to open the discharge valve 73 to a greater extent thus allowing a larger volume of liquor to be discharged so as to hold down the level. Conversely if the level should fall excessively the float within the chamber 74 will lower and cause the valve 73 to be closed somewhat thus permitting the level of the liquor to build up again to the desired point.

The liquor discharged past the connection 72 and valve 73 moves by the connection 75 to a flash tank 76, where vapor is flashed due to lowering of pressure, and from the flash tank the liquor flows by the connection 77 to the pump 78 having the shaft 79 driven by a motor, not shown. From this pump the liquor is finally discharged through the connection 80 to a point of final disposition. The connection 75 has the cut-out valves 81 and 82 in advance of, and behind, the controller valve 73, respectively.

There is a by-pass connection 83 around the controller valve 73, said by-pass connection having the valve 84, so that the system can be operated either with the controller valve in automatic service, or cut out of service. There is also a by-pass connection 85 between the connection 75 in advance of the valve 82, and the connection 77, beyond the flash tank, and provided with a valve 86, the connection 77 being provided with a valve 87 above the connection 85, and another connection 88 between the connection 75 and the connection 77 below the valve 87, and provided with a valve 89. With this scheme the system can be operated either with or without the flash tank and either with or without the controller valve. The flash tank may be connected by the connection 89a to a subsequent vapor head 32 at sufficient low pressure.

It may be noted that in the layout illustrated, there are provided by-pass connections between the liquor intake and liquor delivery connections for each of the effects or sub-effects, which by-passes are suitably valved, so that if desired any particular effect or sub-effect may be by-passed. These are the cross connections 90 between the liquor inlet 33 and the downcomer 35 of the fifth effect, the same being provided with a valve 91; the cross connection 92 between the liquor inlet connection 34 and the downcomer 39 of the fourth effect, the same being provided with the valve 93; the cross connection 94 between the liquor inlet 44 and the downcomer 45 of the third effect, the same being provided with the valve 95; the cross connection 96 between the liquor inlet 49 and the downcomer 50 of the second effect, the same being provided with a valve 97; the cross connection 98 between the liquor inlet 54 and the downcomer 55 of the I—C sub-effect, the same being provided with a valve 99; and the cross connection 100 between the liquor inlet 59 and the downcomer 60 of the I—B sub-effect, the same being provided with a valve 101.

Live steam is supplied through the connections 96a and 97a in parallel to the I—B and I—C sub-effects, being the sub-effects designated 30 and 29 respectively, of the first steam effect, or of the final liquor effect, which live steam serves to heat said sub-effects. Likewise, when a forced feed concentrator sub-effect I—A being designated 31 is used, live steam is supplied through the connection 98a thereto. Inasmuch as the condensate from the sub-effects I—A, I—B and I—C is condensation from live steam, it may be trapped and returned to the boiler if desired. Thus, there are shown for example the condensate connections 99a, 100a, and 101a for condensation from the live steam of these I—A, I—B and I—C sub-effects.

The vapor from the vapor head 31 of the forced feed concentrator, and from the vapor heads 32 of the I—B and I—C sub-effects, is all collected in a manifold connection 102 and delivered into a catchall 103. Any liquor separated in this catchall 103 can be delivered through the connection 104 to any desired point as, for example, to the downcomer 55 of the sub-effect I—C, being designated 29.

The vapor from the catchall 103 is delivered through the connection 105 to the steam chest of the second effect designated 28 and serves to heat the same. The vapor from the vapor head 32 of the second effect 28 is delivered through the connection 106 to the catchall 107, and from said catchall the separated liquor may be delivered by the connection 108 to any suitable point as, for example, to the downcomer 50 of said second effect, designated 28.

The vapor from the catchall 107 is delivered through the connection 109 to the heating unit of the third effect 27; and the vapor from the vapor head 32 of the said third effect is delivered to a connection 110 to the catchall 111. The separated liquor from the catchall 111 may be delivered thru a connection 112 to any suitable point as, for example, the downcomer 45 of said third effect 27.

The vapor from the catchall 111 is delivered thru the connection 113 to the heating unit of the fourth effect 26. The vapor from the vapor head 32 of the fourth effect 26 is delivered thru a connection 114 to a catchall 115; and the liquor trapped in said catchall 115 may be delivered thru a suitable connection 116 to any suitable point as, for example, to the downcomer 39 of the fourth effect 26.

The vapor from the catchall 115 is delivered thru the connection 117 to the heating unit of the fifth effect 25; and the vapor from the vapor head 32 of said fifth effect 25 is delivered thru the connection 118, to the catchall 119. Liquor separated in the catchall 119 is delivered to the connection 120 to a suitable point as, for example, to the downcomer 35 of the fifth effect 25. The vapor from the catchall 119 is delivered through a connection 121 to a suitable condenser 122 which may be of any suitable construction as, for example, of the ejector type.

A connection 123 from the condenser 122 leads to the hot well or any other point of discharge.

The condensation connection 124 from the heating unit of the second effect is carried down thru a downcomer 125 to the position of a control valve 126 located near the floor level, and controlled by an automatic governor 127, preferably of the float type. From this governor control valve 126, there extends a riser pipe 128 reaching up to the position of a flash tank 129, wherein any vapor may be flashed and taken off through the connection 130 and delivered to the heating unit of the next effect; and the condensation from the flash tank 129 is carried down through the downcomer 131 to a position close to the floor level. The connection 131 is provided with a float control, or automatically regulated valve 132 having the float control 133, and being located near the floor level.

The condensation from the heating unit of the third effect 27 is delivered by a connection 134 downwardly to join the connection 131 at floor level in advance of the regulating valve 132, so that said regulating valve controls the condensation from both of the second and third effects.

From the regulating valve 132 there extends the riser pipe 135 to the flash tank 136; which flash tank is provided with a vapor connection 137, which may connect to the heating unit of the next effect, and also with the downcomer pipe 138 leading to a point close to floor level. The condensation from the heating unit of the fourth effect 26 is delivered by the connection 139 downwardly to join the connection 138 at a point close to floor level and in advance of the automatic regulating valve 140 which may be of the automatic type and controlled by the float chamber 141.

From the regulating valve 140 the riser pipe 142 extends upwardly to the flash tank 143; and said flash tank 143 is provided with a vapor connection 144 which may connect to the heating unit of the next effect and with the downcomer pipe 145 through which condensation is delivered to a point close to floor level. The condensation from the heating unit of the fifth effect 25 delivered thru the connection 146 downwardly joins the connection 143 at floor level, and the final condensation pipe 147 is then carried over to a suitable condensate pump.

It will be noted that in each instance the control valve in the condensation pipe is located close to floor level which is ordinarily a distance of some six or eight feet below the position of the flash tank, and also an equivalent distance below the lower end of the heating unit, and that the regulating valve is in each instance located substantially at floor level. Under these circumstances, the riser pipes 128, 135 and 142 are all filled with condensate constituting a column of liquid of the considerable height, so that the hydrostatic pressure created on each automatic regulating valve is correspondingly increased. Such being the case the tendency of such liquid to flash at the position of the valve is reduced and therefore the capacity of said automatic regulating valves may be reduced to substantially the amount necessary to handle the liquid without vapor, being therefore of smaller size than would be necessary in case of flashing at the valve. In other words by locating the flash tanks at a substantial elevation above the location of the automatic regulating valves I make it possible to reduce the size of said valves since they do not need to handle flash. Also the successive flash tanks 129, 136 and 143 may be located at successively lower levels corresponding to the reduced vapor pressure at which they operate.

It is noted that the flash tanks 129, 136 and 143 are located at progressively lower levels so that the bottom delivery connection from each of the tanks 129 and 136 is at a level at least as great as the inlet into the next succeeding flash tank in the direction of condensate flow. This is done for the following reason: In case the pressure differentials between successive evaporators should be unusually small (as when starting up) the resulting pressure differential available to move the condensate from one flash tank, through the piping and automatic control valve would be small, and if the flash tanks should all be placed at the same elevation, the level of condensate would build up in one or more of the flash tanks to a point where the inlet connection would be submerged, with resulting production of severe water hammer and vibration of piping, etc. This danger is eliminated, even in the case of unusually small pressure differentials by placing the flash tanks at the progressively lower levels as shown.

It is to be noted that since each of the sub-effects—1—A, 1—B and 1—C is fed with live steam it is possible to cut off the operation of any one thereof insofar as the steam end is concerned, by merely shutting off the steam supplied to such sub-effect as may be desired. Thus, for example, the sub-effect 1—C may be cut out by merely shutting off the steam supply delivered to the connection 97a. Likewise the flow of liquor thru said sub-effect may be cut out by opening the valve 99 and thus short-circuiting the heating unit of said sub-effect, permitting the liquor to flow directly from the inlet connection 54 to the lower end of the downcomer 55 and thence directly to the pump 56 by which the liquor is then transferred through the connection 58 to the inlet connection 59 of the sub-effect 1—B, designated 30. It thus appears that in case of necessity for replacement or repair of tubes or otherwise in any particular sub-effect, the liquor flow therethrough and also the steam applied thereto can be cut out without difficulty; and at such time the continuous operation of the system may be maintained, but with a somewhat reduced benefit in the concentration of the liquor at that point.

It is to be noted that I have provided blanked-off connections 149, 150, 151 and 152 in the vapor connections 105, 109, 113 and 117 respectively, and also the final blanked-off connection 153 in the final vapor connection 118. It is also to be noted that in the vapor connections 105, 109, 113 and 117 leading from the catchalls to the next successive heating units, there are located the extra flanges 154, 155, 156, and 157 respectively. Likewise in the connections 106, 110 and 114 leading from the successive vapor heads 32, there are placed the extra flange connections 158, 159 and 160 respectively.

By placing in the proper ones of said flanged connections blank discs, i. e. unperforated discs, and by placing temporary cross connections between the connections 149, 150, 151, 152 and 153, it is possible to cut out the steam and vapor flow for any particular effect from which the liquor flow has been temporarily cut off, so that the vapor will be directly transferred past such effect to the next succeeding effect during the interval that the tubes are being replaced or repaired, as already referred to.

It will now be apparent that with the arrangement so far described the liquor flows in a backwardly direction in comparison to the steam or vapor flow, and that the liquor is introduced into the last two effects, being the thin liquor effect, in parallel although the steam or vapor in said effect passes through them in series. It will also be apparent that the liquor flows from these two effects in series through all of the other effects and sub-effects clear through to the point of discharge; and that notwithstanding this circumstance, the sub-effects of the first effect are all provided with live steam in parallel with each other and that the vapor from all of said sub-effects of the first effect is collected in parallel and then delivered to the second effect of the series.

Under these conditions it will be evident that the freshly introduced thin liquor enters the fourth and fifth effects in parallel and is subjected to a sharp increase of concentration in these two effects, and is then delivered to the third effect at that considerably increased concentration; and due to this circumstance the tendency of the liquor to foam when so introduced at low concentration is greatly reduced or entirely eliminated, notwithstanding the fact that the vapor heads of the last or fourth and fifth effects operate at a very low pressure. This is a very desirable result particularly in the concentration or treatment of such liquors as "black liquor" which are usually delivered to the system initially at a low concentration.

Figure 10:
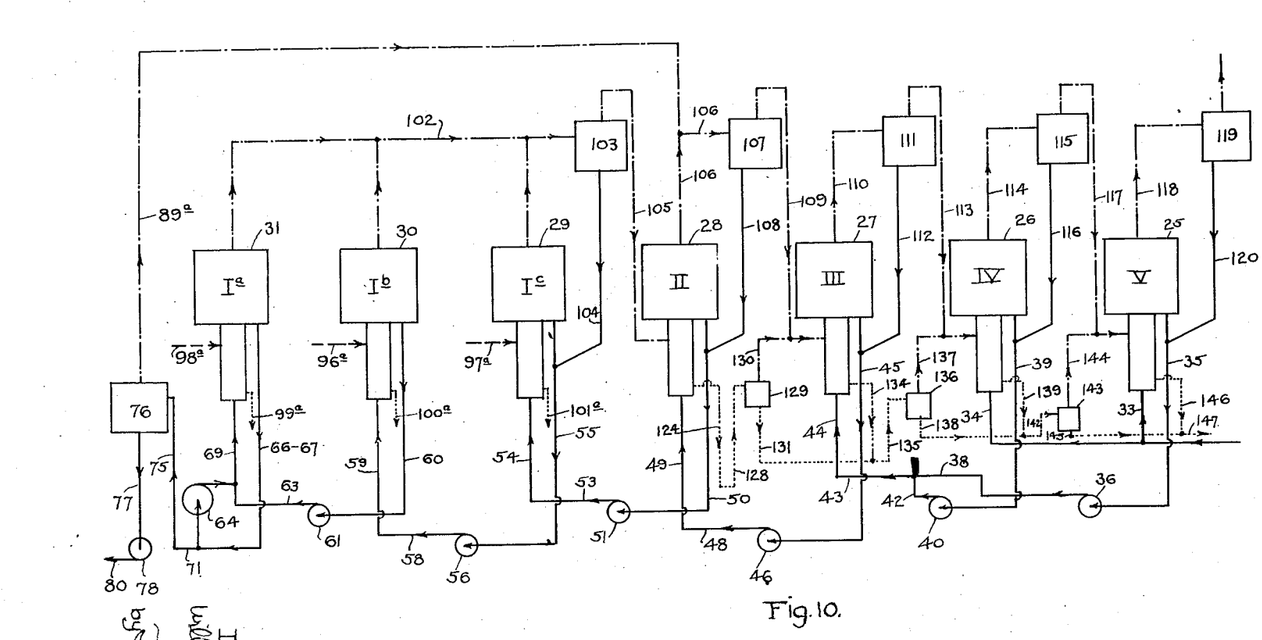
Figure 10 shows a typical flow sheet corresponding to the installation shown in Figures 1 to 9 inclusive.

It is also evident that, for the reasons already set forth, it is possible to use sub-effects for the first effect, herein designated I—B and I—C, or 30 and 29 respectively, of relatively small size, since the concentration of the liquor in the effect I—C, designated 29, is still low enough so that the operation of this unit may be very efficiently performed with a high coefficient of heat transfer, leaving the final concentration of only a small percent total solids to be performed in the effect I—B, designated 30 (except in those cases in which it is also desired to make use of a forced feed concentrator herein designated I—A or 31). In other words the sub-division of the first effect into two or more smaller sub-effects thru which the liquor is passed in series, and both of which sub-effects are heated by steam in parallel, the vapor heads of both sub-effects also being connected in parallel, makes possible the use of a combination of sub-effects of much smaller total capacity and square footage than would otherwise be necessary for a single effect to handle the necessary volume of liquor and carry the concentration between the limits desired for both of these sub-effects. Figure 10 shows the layout of Figures 1-9, inclusive in diagrammatic form, and in view of the detailed description heretofore given it is not believed necessary to make further detailed description of Figure 10, on which the reference numerals are the same as in Figures 1-9.

Figure 11:
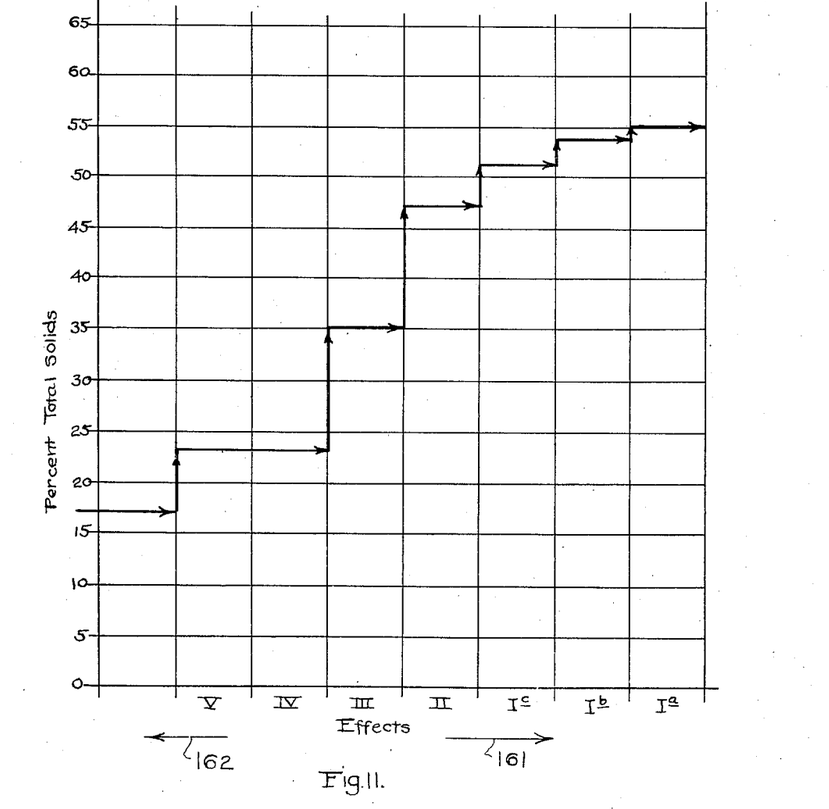
Figure 11 shows a step diagram of the various effects showing more or less typically the manner in which the incoming liquor is progressively concentrated as it flows backwardly thru the various effects to the point of discharge.

This feature may be better understood and its significance appreciated by reference to the step diagram of Figure 11. In that diagram the flow of liquor is toward the right as shown by the arrow 161, the flow of vapor being toward the left as shown by the arrow 162. Concentrations are shown by the vertical ordinates in the diagram. In the illustration shown in this figure it will be noted that the liquor enters the two final effects, four and five, at the low concentration of seventeen percent total solids and its concentration is raised to substantially twenty-three percent total solids in those two effects. In the next or third effect, the concentration is stepped up from twenty-three to thirty-five percent total solids; and in the next or second effect the concentration is stepped up from thirty-five to forty-seven percent total solids.

The liquor enters the sub-effect I—C at a concentration of forty-seven percent total solids and is stepped up to fifty-one percent total solids, an increase of four percent. In the next sub-effect I—B the liquor enters at fifty-one percent total solids and is stepped up to fifty-three and one-half percent total solids, an increase of only one and one-half percent. The essential point noted here is that the concentration of the liquor effected in sub-effect I—C is much greater than that effected in the sub-effect I—B for the reasons already set forth.

In the illustration assumed in this diagram the liquor from the sub-effect I—B is passed to the sub-effect I—A which is the forced feed concentrator at a concentration of fifty-three and one-half percent total solids and is raised in the forced feed concentrator up to a percentage of fifty-five total solids, at which point it is discharged.

Figure 12:
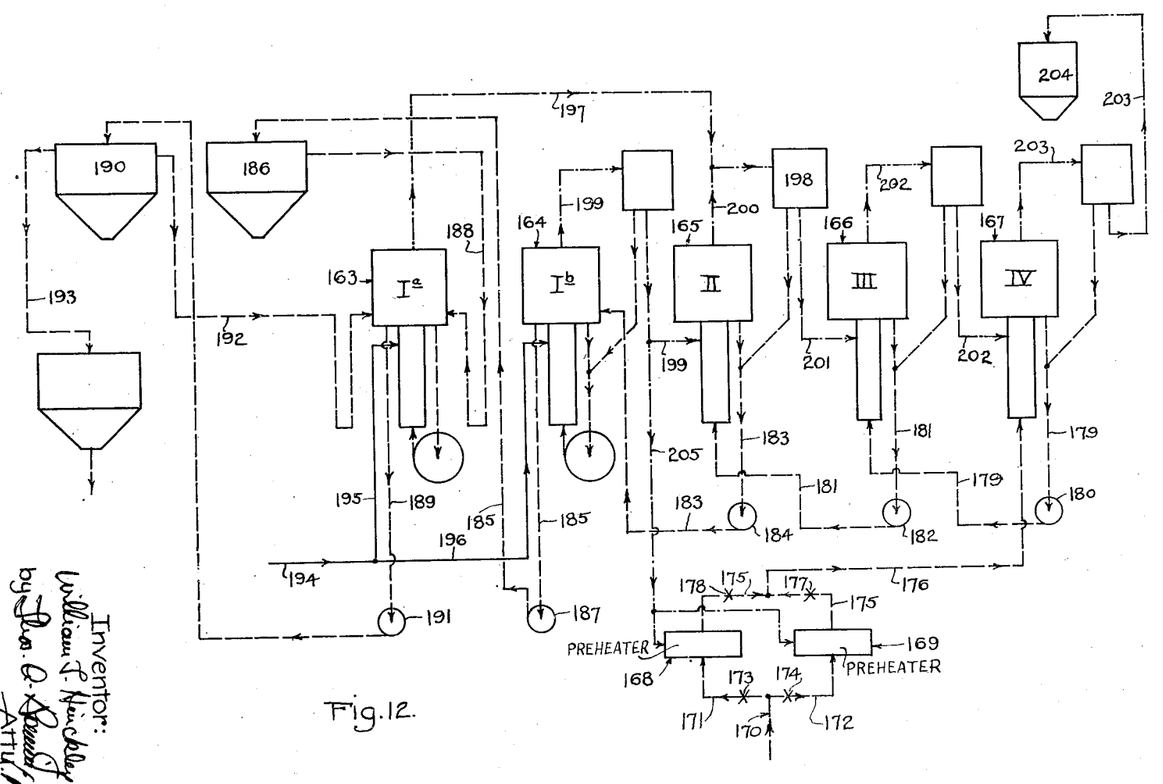
Figure 12 shows a typical flow sheet of another embodiment of my invention in which the first effect is divided into two sub-effects through which the liquor flows in series for the final liquor concentration, the vapor head of one sub-effect delivering steam to the third effect, and the vapor head of the other sub-effect delivering steam to the second effect.

The modified arrangement shown in Figure 12 is adapted especially to the concentration of such salting solutions as brine, etc., in which special provision must be made for the final concentration to a high degree. The scheme shown in this Figure 12 may be termed a "mixed backward flow" arrangement. It includes the divided first effect including the evaporators 1a and 1b, designated 163 and 164, together with the second, third and fourth effects, designated 165, 166 and 167 respectively. The incoming raw liquor is first preheated and is then passed to the fourth effect. The degree of this preheating is such that vapor from the first effect may be used. I have shown the two preheaters 168 and 169 which may be used in alternation. These preheaters may be of suitable form such as tubular heat exchangers of either the forward or counter current flow type.

The feed liquor comes in over the line 170 to the manifold connections 171 and 172 leading to the two preheaters and valves 173 and 174 control delivery to the preheaters selectively. From the preheaters a manifold connection 175 carries the preheated liquor to the line 176, and the valves 177 and 178 are used in the selective operation of the preheaters. The line 176 leads to the liquor feed connection of the fourth effect; the liquor line 179 leads from the fourth effect back to the liquor inlet connection of the third effect, being provided with the pump 180; the liquor line 181 leads from the third effect back to the liquor inlet connection of the second effect, being provided with the pump 182; the liquor line 183 leads from the second effect back to the liquor inlet connection of the 1—B effect, being provided with the pump 184; the liquor line 185 leads from the 1—B effect to the settling tank 186, being provided with the pump 187; the overflow from the settling tank 186 flows by the line 188 to the liquor inlet connection of the 1—A effect; the liquor line 189 leads from the 1—A effect to the second settling tank 190, being provided with the pump 191; and the overflow line 190 leads from the second settling tank 190 back to the 1—A effect for recirculation of liquor. The 1—A and 1—B effects are shown as being forced circulation units of well known type.

The final overflow liquor line 193 leads from the settling tank 190 for subsequent disposition of the liquor.

The 1—A and 1—B effects are heated by live steam from the line 194 over the lines 195 and 196; the vapor from the vapor head of the 1—A effect is carried by the line 197 to the catchall 198; the vapor from the vapor head of the 1—B effect is carried by the line 199 to the steam chest of the second effect; the vapor from the vapor head of the second effect goes over the line 200 to the catchall 198; the vapor from the catchall 198 goes over the line 201 to the steam chest of the third effect; the vapor from the vapor head of the third effect goes over the line 202 to the steam chest of the fourth effect; and the vapor from the vapor head of the fourth effect goes over the line 203 to the condenser 204.

A branch vapor line 205 leads from the line 199 to the heaters 168 and 169 so that the feed temperature of the liquor is determined by the temperature of the vapor coming from the 1—B effect. This temperature is higher than that of the vapor coming from the 1—A effect, but lower than the live steam temperature, due to the placement of the second effect between the position of the line 199 and the catchall 198.

Thus it is seen that the liquor feed temperature is adjusted to a value between the raw steam temperature and the temperature of vapor coming from the second effect. Nevertheless the two sub-effects 1—A and 1—B are both heated by live steam of the same temperature and in parallel; but the vapor head of the 1—B effect will be at a higher pressure, or less vacuum, than the vapor head of the 1—A effect. Also, the liquor treated in the 1—B sub-effect is of less concentration than that in the 1—A sub-effect, so there will naturally be more vapor available from the 1—B sub-effect than from the 1—A sub-effect. Thus there is available a surplusage of vapor from the 1—B sub-effect, some of which may be used for the operation of the preheaters.

Figure 13:
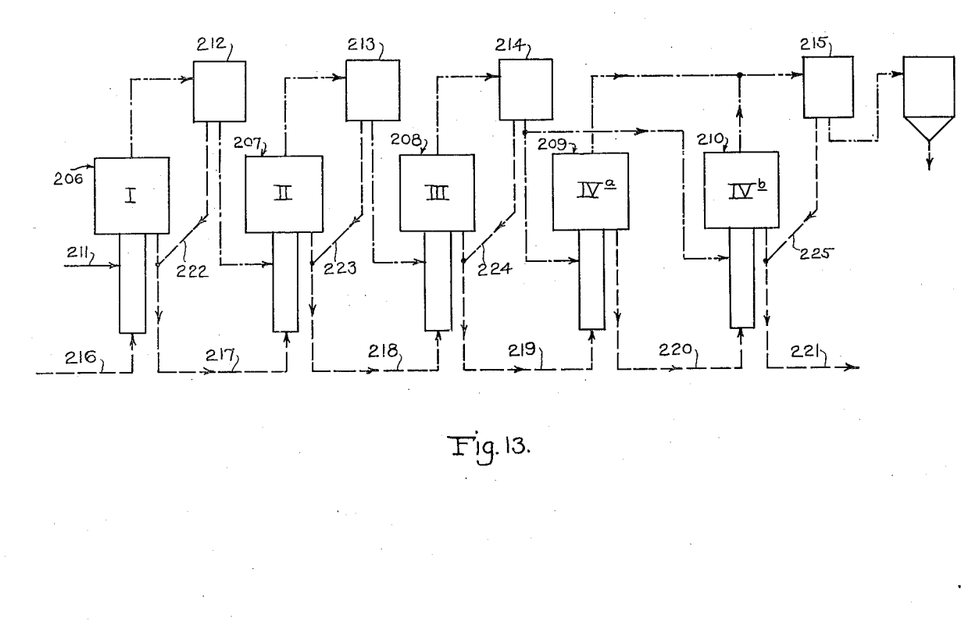
Figure 13 shows a typical flow sheet of a forward liquor flow embodiment of my invention with divided thick liquor effect.

The modified arrangement shown in Figure 13 is of the forward flow type. In this case the first, second and third effects are designated 206, 207 and 208 respectively. The fourth effect is divided as shown into the sub-effects 4—A and 4—B designated 209 and 210 respectively. Live steam is supplied to the first effect 206 over the line 211; vapor from the first effect flows through the catchall 212 to the second effect 207; vapor from the second effect flows through the catchall 213 to the third effect; and vapor from the third effect flows through the catchall 214 to the two sub-effects 4—A and 4—B in parallel. Vapor from both the 4—A and 4—B sub-effects flows through the catchall 215 to a suitable point, such as a condenser.

The incoming thin liquor from the line 216 flows through the first effect, then over the line 217, through the second effect, then over the line 218, through the third effect, then over the line 219, through sub-effect 4—A, then over the line 220 through sub-effect 4—B to the final or thick liquor line 221. Liquor collected in the catchalls 212, 213, 214 and 215 may be returned to the connections 217, 218, 219 and 221 over the lines 222, 223, 224 and 225 as shown.

Figure 14:
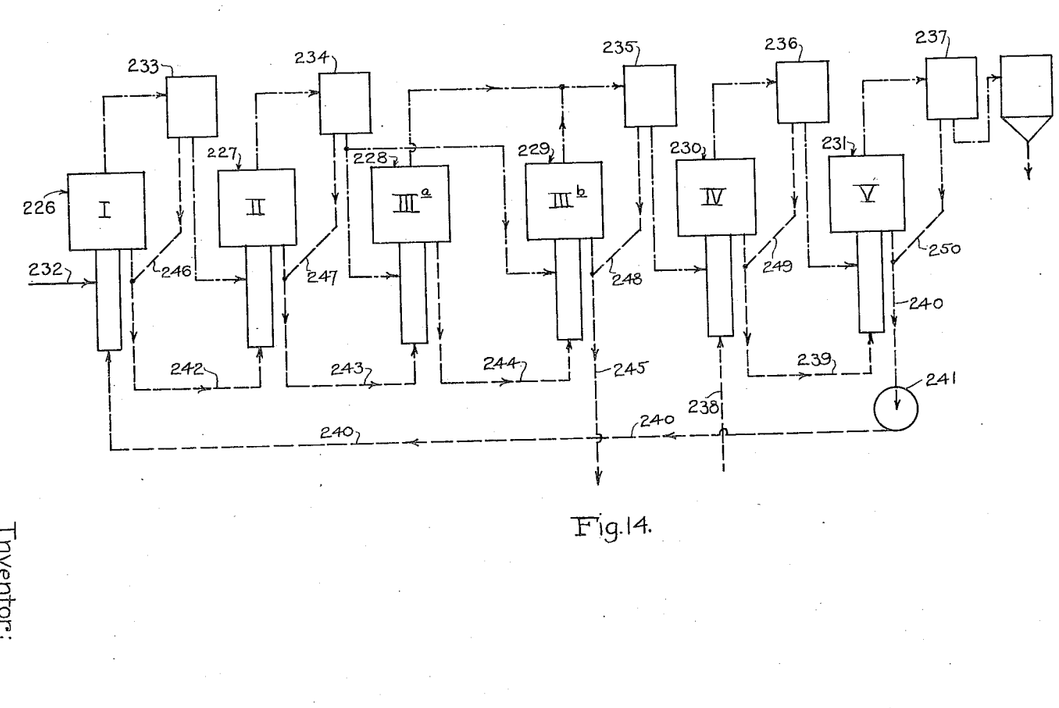
Figure 14 shows a typical flow sheet of a mixed liquor flow embodiment of my invention with divided thick liquor effect.

The modified arrangement shown in Figure 14 is of a mixed flow type. In this case the third effect is divided into 3—A and 3—B. The first and second effects are designated as 226 and 227; the 3—A and 3—B sub-effects are designated as 228 and 229; and the fourth and fifth effects are designated as 230 and 231. Live steam is supplied to the first effect 226 by the line 232; vapor from the first effect flows through the catchall 233 to the second effect 227; vapor from the second effect flows through the catchall 234 to the 3—A and 3—B sub-effects in parallel; vapor from the 3—A and 3—B sub-effects flows in parallel through the catchall 235 to the fourth effect; vapor from the fourth effect flows through the catchall 236 to the fifth effect; and the vapor from the fifth effect flows through the catchall 237 to a suitable condenser or other point of discharge.

The incoming liquor flows first to the fourth effect over the line 238; from the fourth effect the liquor flows over the line 239 to the fifth effect; from the fifth effect the liquor flows over the line 240, the pump 241, to the first effect; from the first effect the liquor flows over the line 242 to the second effect; from the second effect the liquor flows over the line 243 to the 3—A sub-effect; from the 3—A sub-effect the liquor flows over the line 244 to the 3—B sub-effect; and the thick liquor is finally discharged over the line 245. Liquor collected in the catchalls 233, 234, 235, 236 and 237 may be returned to the connections 242, 243, 245, 239 and 240 over the lines 246, 247, 248, 249 and 250 as shown.

The various flow sheets herein illustrated are typical only of some embodiments of my invention and are not given in any sense as limitations or as circumscribing the scope of my invention except as may be done in the claims.

I claim:

1. In a multiple effect evaporator for the progressive concentration of liquor, a series of evaporators each including a bundle of tubes, means for introducing liquor to be treated into such tubes, a vapor head in conjunction with said tubes for the reception of liquor of increased concentration and vapor liberated from said liquor, and also including a shell surrounding said bundle of tubes and a connection for the delivery of heating medium into said shell at one point and for the removal of condensation from the lower end of said shell, a downcomer from the condensation connection of each shell to a point close to the floor level, a valve located substantially at floor level receiving condensate from said downcomer and delivering the same upwardly through a riser pipe, a flash tank at the upper end of said riser pipe, a downcomer from said flash tank to the downcomer for condensation from a successive effect and a connection for the delivery of condensate from the flash tank to the heating connection of a succeeding effect, substantially as described.

2. In a multiple effect evaporator for the progressive concentration of liquor, the combination of the series of effects, each effect comprising a bundle of liquor tubes, means to supply liquor to said tubes, a vapor head in conjunction with said tubes and adapted to receive liquor of increased concentration together with vapor released from said liquor from tubes, and also including a shell surrounding said tubes, a connection for supply of heating medium into said shell at one point, and a connection for delivering condensate from the lower portion of said shell, together with means for removing condensate from all of the effects comprising downcomer pipes from the condensate connections of the various effects to points close to the floor level, automatic regulator valves at the lower ends of said downcomer pipes, riser pipes from said automatic regulating valves, flash tanks at the upper ends of said riser pipes, said flash tanks being located at progressively lower levels from effect to effect, downcomer pipes from the flash tanks to the downcomers for condensation from the successive effects, and vapor connections from the flash tanks to the heating unit connections of successive effects, substantially as described.

3. The method of reducing the tendency toward foaming of thin "Black Liquor," in the initial concentration thereof in a multiple effect evaporator of the long tube vertical type in which liquor flows upwardly through tubes from a low elevation inlet to a higher elevation outlet, which consists in introducing such thin "Black Liquor" from a common source simultaneously into a plurality of sub-effects in parallel independent streams, and subjecting the independent streams of liquor in said sub-effects to different temperatures and to different degrees of vacuum, and in mix'ng the treated liquor from both said sub-effects after treatment therein for subsequent treatment in said system, substantially as described.

4. The method of reducing the tendency towards foaming of thin "Black Liquors' in the initial concentration thereof in a multiple effect evaporator of the long tube vertical type in which liquor flows upwardly through tubes from a low elevation inlet to a higher elevation outlet which consists in introducing a plurality of independent streams of such thin "Black Liquor" simultaneously into a plurality of sub-effects, simultaneously heating the independent streams of liquor aforesaid to different temperatures, simultaneously subjecting the independent streams to different degrees of vacuum, and mixing the treated liquor from both of said independent streams for subsequent treatment, substantially as described.

WILLIAM T. HINCKLEY.